United States Patent
Van Dusen et al.

(10) Patent No.: US 6,355,391 B1
(45) Date of Patent: Mar. 12, 2002

(54) MICRO-POWDER COATING FOR XEROGRAPHIC CARRIER

(75) Inventors: John Gregory Van Dusen, Walworth; Thomas R. Hoffend, Webster, both of NY (US); Vladislav Skorokhod; Richard Phillip Nelson Veregin, both of Mississauga (CA); Deepak R. Maniar, Penfiled; Mary L. McStravick, Fairport, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/722,346

(22) Filed: Nov. 28, 2000

(51) Int. Cl.⁷ .............................. G03G 9/113
(52) U.S. Cl. ................. 430/111.32; 428/402
(58) Field of Search .................. 430/111.1, 111.32, 430/111.35; 428/402

(56) References Cited

U.S. PATENT DOCUMENTS

| | | |
|---|---|---|
| 4,233,387 A | 11/1980 | Mammino et al. |
| 5,290,654 A | 3/1994 | Sacripante et al. |
| 5,529,719 A * | 6/1996 | Cuinningham et al. ..... 428/402 |
| 5,567,562 A | 10/1996 | Creatura et al. |
| 5,900,344 A * | 5/1999 | Silence et al. ........... 430/111.1 |
| 5,928,830 A | 7/1999 | Cheng et al. |
| 6,042,981 A | 3/2000 | Barbetta et al. |

* cited by examiner

Primary Examiner—John Goodrow
(74) Attorney, Agent, or Firm—Oliff & Berridge, PLC; Eugene O. Palazzo

(57) ABSTRACT

A micro-powder includes:

(i) a sub-micron sized powder recovered from a synthetic latex emulsion of polymer and surfactant;

(ii) a conductive filler incorporated into the powder; and (iii) optional charge enhancing additives incorporated into the powder.

The conductive micro-powder finds particular utility as a coating for carrier core particles of toner and developer compositions.

27 Claims, No Drawings

MICRO-POWDER COATING FOR XEROGRAPHIC CARRIER

BACKGROUND OF THE INVENTION

1. Field of Invention

The invention relates to a micro-powder resin. In particular, the invention relates to a novel carrier coating for xerographic carriers which uses a sub-micron sized powder recovered from a latex emulsion as the base resin in the carrier coating. The coating resins find particular utility as a coating for xerographic carriers.

2. Description of Related Art

The electrostatographic process, and particularly the xerographic process, is well known. This process involves the formation of an electrostatic latent image on a photoreceptor, followed by development of the image with a developer, and subsequent transfer of the image to a suitable substrate. Numerous different types of xerographic imaging processes are known wherein, for example, insulative developer particles or conductive developer particles are selected depending on the development systems used. Moreover, of importance with respect to the aforementioned developer compositions is the appropriate triboelectric charging values associated therewith, as it is these values that enable continued formation of developed images of high quality and excellent resolution. In two component developer compositions, carrier particles are used in charging the toner particles.

Carrier particles in part consist of a roughly spherical core, often referred to as the "carrier core," which may be made from a variety of materials. The core is typically coated with a resin. This resin may be made from a polymer or copolymer. The resin may have conductive material or charge enhancing additives incorporated into it to provide the carrier particles with more desirable and consistent triboelectric properties. The resin may be in the form of a powder, which may be used to coat the carrier particle. Often the powder or resin is referred to as the "carrier coating" or "coating."

Prior art methods of incorporating conductive material into carrier coating include the use of electrostatic attraction, mechanical impaction, in situ polymerization, dry-blending, thermal fusion and others. These prior art methods of incorporating conductive material into carrier coatings often result in only minimal amounts of conductive material being incorporated into the coating or produces conductive carrier coatings too large for effective and efficient use in some of the smaller carriers. Other prior art conductive coating resins use dry-blending processes and other mixing to incorporate the carbon black or other conductive material into the polymer. However, in order to avoid transfer of carbon black from conductive polymers so obtained, the amount of carbon black that can be blended is severely limited, e.g., to 10% by weight or less. This in turn severely limits the conductivity achievable by the resultant conductive polymer.

In addition to the problems associated with loading conductive materials into coating resins, recent efforts to advance carrier particle science have focused on the attainment of coatings for carrier particles to improve development quality and provide particles that can be recycled and that do not adversely affect the imaging member in any substantial manner. Many of the present commercial coatings can deteriorate rapidly, especially when selected for a continuous xerographic process where the entire coating may separate from the carrier core in the form of chips or flakes causing failure upon impact or abrasive contact with machine parts and other carrier particles. These flakes or chips, which cannot generally be reclaimed from the developer mixture, have an adverse effect on the triboelectric charging characteristics of the carrier particles, thereby providing images with lower resolution in comparison to those compositions wherein the carrier coatings are retained on the surface of the core substrate.

Further, another problem encountered with some prior art carrier coatings resides in fluctuating triboelectric charging characteristics, particularly with changes in relative humidity. High relative humidity hinders image density in the xerographic process, may cause background deposits, leads to developer instability, and may result in an overall degeneration of print quality. In the science of xerography, the term "A Zone" is used to refer to hot and humid conditions, while the term "C Zone" is used to refer to cold and dry conditions. Triboelectric charges are usually lower in the "A Zone" than in the "C Zone." It is desirable to have the measured triboelectric charges ($_{tc}$) for a particular carrier in the A Zone and the C Zone, when entered into a ratio of A zone$_{tc}$/C zone$_{tc}$, to be close to 1.0 in order to obtain good development in high humidity.

A carrier coating commonly used is #MP-116 PMMA available from Souken Chemical in Japan. This powder typically has a diameter of 0.4 to 0.5 micrometers and is a made from polymethyl methacrylate. However, it is required to use high amounts of #MP-116 PMMA to coat 30 to 50 micrometer carrier cores to achieve surface area coverage on the carrier of 85% to 95%. Use of such high amounts of carrier coating often results in lower carrier yields due to fused aggregates. Fused aggregates must be broken up or removed by screening. Crushing or breaking up of the aggregates may result in weak or "chipped off" areas on the carrier surface potentially causing poor coating quality. Screen separation may result in a lower yield as aggregates are removed from the final product.

Various coated carrier particles for use in electrostatographic developers are known in the art. Carrier particles for use in the development of electrostatic latent images are described in many patents including, for example U.S. Pat. No. 3,590,000. These carrier particles may consist of various cores, including steel, with a coating thereover of fluoropolymers and ter-polymers of styrene, methacrylate, and silane compounds.

There is illustrated in U.S. Pat. No. 4,233,387 coated carrier components for electrostatographic developer mixtures comprised of finely divided toner particles clinging to the surface of the carrier particles. Specifically, there is disclosed in this patent coated carrier particles obtained by mixing carrier core particles of an average diameter of from between about 30 microns to about 1,000 microns, with from about 0.05 percent to about 3.0 percent by weight, based on the weight of the coated carrier particles, of thermoplastic resin particles. The resulting mixture is then dry blended until the thermoplastic resin particles adhere to the carrier core by mechanical impaction, and/or electrostatic attraction. Thereafter, the mixture is heated to a temperature of from about 320° F. to about 450° F. for a period of 20 minutes to about 60 minutes, enabling the thermoplastic resin particles to melt and fuse on the carrier core. While the developer and carrier particles prepared in accordance with the process of this patent, the disclosure of which is incorporated herein by reference in its entirety, are suitable for their intended purposes, the conductivity values of the resulting particles are not constant in all instances, for example, when a change in carrier coating weight is accomplished to achieve a modification of the triboelectric charging characteristics. Further in regard to U.S. Pat. No. 4,233,387, only specific triboelectric charging values can be generated, when certain conductivity values or characteristics are contemplated.

U.S. Pat. No. 4,937,166, incorporated by reference herein in its entirety, describes a carrier composition comprised of a core with a coating thereover comprised of a mixture of first and second polymers that are not in close proximity thereto in the triboelectric series. The core is described to be iron, ferrites, steel or nickel. The first and second polymers are selected from the group consisting of polystyrene and tetrafluoroethylene; polyethylene and tetrafluoroethylene; polyethylene and polyvinyl chloride; polyvinyl acetate and tetrafluoroethylene; polyvinyl acetate and polyvinyl chloride; polyvinyl acetate and polystyrene; and polyvinyl acetate and polymethyl methacrylate. The particles are described to have a triboelectric charging value of from about −5 to about −90 microcoulombs per gram.

U.S. Pat. No. 4,935,326, incorporated by reference herein in its entirety, discloses a carrier and developer composition, and a process for the preparation of carrier particles with substantially stable conductivity parameters which comprises (1) providing carrier cores and a polymer mixture; (2) dry mixing the cores and the polymer mixture; (3) heating the carrier core particles and polymer mixture, whereby the polymer mixture melts and fuses to the carrier core particles; and (4) thereafter cooling the resulting coated carrier particles. These particulate carriers for electrophotographic toners are described to be comprised of core particles with a coating thereover comprised of a fused film of a mixture of first and second polymers which are not in close proximity in the triboelectric series, the mixture being selected from the group consisting of polyvinylidenefluoride and polyethylene; polymethyl methacrylate and copolyethylene vinyl acetate; copolyvinylidenefluoride tetrafluoroethylene and polyethylenes; copolyvinylidenefluoride tetrafluoroethylene and copolyethylene vinyl acetate; and polymethyl methacrylate and polyvinylidenefluoride.

U.S. Pat. No. 5,567,562, incorporated by reference herein in its entirety, describes a process for the preparation of conductive carrier particles which comprises mixing a carrier core with a first polymer pair and a second polymer pair, heating the mixture, and cooling the mixture, wherein the first and second polymer pair each contain an insulating polymer and a conductive polymer and wherein the carrier conductivity thereof is from about $10^{-6}$ to about $10^{-14}$ (ohm-cm)$^{-1}$. The first polymer pair is preferably comprised of an insulating polymethyl methacrylate and a conductive polymethyl methacrylate, and the second polymer pair is preferably comprised of an insulating polyvinylidenefluoride and a conductive polyvinylidenefluoride.

There is illustrated in U.S. Pat. No. 6,042,981, incorporated by reference herein in its entirety, carriers including a polymer coating wherein the polymer coating may contain a conductive component, such as carbon black, and which conductive component, is preferably dispersed in the polymer coating. The conductive component is incorporated into the polymer coating of the carrier core by combining the carrier core, polymer coating, and the conductive component in a mixing process such as cascade roll mixing, tumbling, milling, shaking, electrostatic powder cloud spraying, fluidized bed, electrostatic disc processing or by an electrostatic curtain. After the mixing process, heating is initiated to coat the carrier core with the polymer coating and conductive component.

There is illustrated in U.S. Pat. No. 5,928,830, incorporated by reference herein in its entirety, processes for the preparation of black and color toner compositions. This toner is prepared from latex comprised of a polymer core and a polymer shell thereover. The latex is fused or coalesced together forming toner particles comprised of an aggregation of the latex. Conductive or pigment components may incorporated into the latex cores/shell, prior to coalescence, by blending a dispersion of the conductive or pigment component in a cationic surfactant with the latex core/shell in an ionic or non-ionic surfactant. Specific examples of conductive components incorporated in U.S. Pat. No. 5,928,830 include conductive carbon black SC Ultra available from Conductex Inc. and antimony-doped tin oxide Zelec ECP3005-XC manufactured by E. I. DuPont.

As described above, there is a continuing need to be able to incorporate high amounts of conductive material into coating resins while providing for and maintaining desirable xerographic qualities such as high coating efficiency, proper performance in both the A zone and the C zone, and stable charging characteristics.

SUMMARY OF THE INVENTION

It is an object of the invention to develop a micro-powder for use in coating xerographic carriers capable of achieving specific levels of conductivity and with high surface area coverage of the xerographic carrier while using less amounts of coating powder than is used in prior art coating powders.

It is another object of the invention to develop a micro-powder which is less time consuming and less expensive to manufacture than prior art coating powders.

It is a further object of the invention to develop a micro-powder for coating xerographic carriers resulting in xerographic carriers possessing excellent xerographic properties in both the A zone and the C zone for use in toner and developer compositions.

These and other objects of the present invention are achieved herein.

The present invention is directed to a micro-powder. The micro-powder contains, as the primary resin, polymer particles recovered from a latex emulsion polymerization or co-polymerization with a surfactant. Conductive materials, and optionally charge enhancing additives, are also incorporated with the polymer powder to form the micro-powder. The micro-powder may then be incorporated onto the surface of xerographic carrier cores using techniques well known in the art.

The present invention provides for a micro-powder carrier coating possessing excellent and unique properties ideally suited for particular use in a developer for an electrostatographic printing device. These micro-powders provide improved coating coverage of the carrier in lower amounts. These micro-powders also provide superior triboelectric charging capabilities.

DETAILED DESCRIPTION OF PREFERRED EMBODIMENTS

The present invention provides a micro-powder comprising sub-micron sized polymer powder from a polymeric emulsion, conductive filler incorporated into the polymer powder and optionally, charge-enhancing additives also are incorporated into the polymer powder. The micro-powder is preferably used as a coating that is to be coated onto xerographic carrier cores.

The sub-micron sized polymer particles are most preferably recovered from a latex emulsion of a polymer and surfactant. The latex emulsion may be formed by the copolymerization of monomers, including methyl methacrylate, in the presence of an emulsifying agent, such as dodecyl sulfate-sodium salt, and by a process specified herein. The particles are typically sub-micron in size. As used herein, sub-micron is defined as less than about 1 micrometer as measured by a Coulter-LS measurement.

The sub-micron polymer particles used in the carrier coating of the present invention are most preferably synthesized via emulsion polymerization. This particular method of polymerization is well known and has been thoroughly described in many patents. See, for example, U.S. Pat. Nos. 6,042,981 and 5,290,0654, incorporated herein by reference. Emulsion polymerization, yielding excellent control over particle size and size distribution, is most typically accomplished by the continuous addition of monomer to a suitable reaction vessel containing water. The reaction vessel is provided with stirring means, and also optionally, nitrogen atmosphere and thermostatic control. The polymerization is affected by heating to, for example, between about 40° C. and about 85° C., and with the addition of an appropriate initiator compound, such as ammonium persulfate.

Polymers suitable for this invention are any suitable polymer or copolymer which retain a suitable particle size for use in a carrier coating as described herein. In a preferred embodiment, a methyl methacrylate polymer or copolymer is used as the polymer generated as a latex emulsion. Suitable comonomers that may be used to form a PMMA copolymer include, for example, monoalkyl or dialkyl amines such as dimethylaminoethyl methacrylate, diethylaminoethyl methacrylate, diisopropylaminoethyl methacrylate, acrylic or methacrylic acids, or fluoroalkyl or perfluorinated acrylic and methacrylic esters, such as, for example fluoro-ethyl methacrylate or fluoro-ethylacrylate. 2,2,2 trifluoro-ethyl methacrylate is an especially preferred fluoro-ethyl methacrylate.

The monomer or monomer mixture is gradually mixed into an aqueous solution of surfactant such that only 5% to 30% of the total amount of monomer, is emulsified, preferably while maintaining continuous mixing. Initiation of polymeric latex particles is accomplished by rapid addition of a standard ammonium persulfate solution, followed by a metered addition of the remaining monomer supply. Metered rate is about 0.1 to about 5.0 grams per minute, preferably at about 1.5 grams per minute, for latex preparations of up to 350 grams. The mixing is continued after addition of the final amount of monomer. Temperature is also maintained within a preferred range of 60 to 70° C.

The mixing is performed at a rate of, for example, about 50 to about 300 revolutions per minute for about 1 to 6 hours using any mechanical mixing apparatus well known in the art. Preferably, the dispersion is mixed at a rate of about 100–200 revolutions per minute for about 2 to 4 hours, with temperature between 65 to 67° C.

Preferred surfactants are of the anionic type. Suitable surfactants include sodium dodecylbenzene sulfonate, "SLS" (dodecyl sulfate-sodium salt), dodecylnapthalene sulfate, and others. Most preferably, no other surfactants of a different class or polarity are present.

The surfactant is added in an amount of 0.2% to 5% by weight of the monomer polymerized. In a preferred embodiment, the surfactant is SLS in the range of 0.4% to 0.8% by weight of the monomer to be polymerized. The initiator is preferably ammonium persulfate in a range of 0.2% to 1.0% by weight of the monomer. By procedures well known to the art, surfactant concentration is used to regulate latex particle size, while initiator level is used to regulate the molecular weight of the polymer produced.

The recovery of the polymer particles from the emulsion suspension can be accomplished by processes well known in the art. For example, the emulsion of polymer particles can first be filtered by any suitable material. In a preferred embodiment, a cheese cloth is used. The polymer particles can then be washed, but in a preferred embodiment, the polymer particles are not washed, thus allowing some amount of the surfactant to remain in association with the conductive polymer particles. Allowing some amount of the surfactant to remain in association with the polymer particles provides for better sub-micron particle formation and better carrier coating characteristics. It is believed that the surfactants' interplay with the surface chemistry of the polymer particles provides for these improved results. Finally, the polymer particles are dried using, e.g., freeze drying, spray drying or vacuum techniques well known in the art.

The polymer particles isolated from the process have an initial size of, for example, from about 0.01 micrometers to <1.0 micrometer. Due to physical aggregates, some of the polymer particles may initially be larger than 1.0 micrometer. During the mixing process with the conductive filler and/or the carrier cores, the physical aggregates of the polymer particles will be broken up into sub-micron polymer particles. Preferably, the polymer particles obtained by the process herein have a size of, for example, about 0.04 micrometers to about 0.250 micrometers. Most preferably, the resulting polymer particles obtained by the process herein have a size of about 0.08 micrometers to about 0.120 micrometers.

After the formation and recovery of the sub-micron sized polymer particles, at least one conductive filler is incorporated with the polymer particles. The inclusion of conductive filler into carrier coating resin is well known in the xerographic arts. Various types of conductive filler may be incorporated into the present invention. The conductive material described may be any suitable material exhibiting conductivity, e.g., metal oxides, metals, carbon black, etc.

The micro-powder of the present invention enables carriers to achieve a wide range of conductivity. Carriers using the micro-powder of the present invention may exhibit conductivity of from about $10^{-6}$ to about $10^{-14}$ (ohm-cm)$^{-1}$. Preferably, carriers using the micro-powder of the present invention may exhibit conductivity of from about $10^{-8}$ to about $10^{-10}$ (ohm-cm)$^{-1}$. Most preferably, carriers using the micro-powder of the present invention may exhibit conductivity of about $10^{-9}$ (ohm-cm)$^{-1}$.

The conductive filler incorporated into the polymer particles in the process has a size of, for example, from about 0.012 micrometers to about 0.5 micrometers. Preferably, the conductive filler used herein has a size of, for example, from about 0.02 micrometers to about 0.05 micrometers. In a preferred embodiment, carbon black is the conductive filler, with size and surface area to provide the proper conductivity range. An especially preferred carbon black is VULCAN XC72, manufactured by Cabot Corporation, which has a particle size of 0.03 micrometers, and a surface area of 250 meter$^2$/gram.

The conductive filler is incorporated into the polymer particles using techniques well known in the art including the use of various types of mixing and/or electrostatic attraction, mechanical impaction, dry-blending, thermal fusion and others.

The micro-powder may contain about 5% to about 20% by weight conductive filler, although in some embodiments the micro-powder may contain only about 0.5% by weight conductive filler. In a preferred example, the micro-powder may contain about 6.0% to about 12.0% by weight of a conductive filler.

In addition to incorporating conductive filler into carrier coatings, it is often desirable to impart varying charge characteristics to the carrier particle by incorporating charge enhancing additives. If incorporated with the sub-micron sized polymer particles, the charge enhancing additives may be incorporated in a premixing process before or after the incorporation of the conductive filler.

Typical charge enhancing additives include particulate amine resins, such as melamine, and certain fluoro polymer powders such as alkyl-amino acrylates and methacrylates, polyamides, and fluorinated polymers, such as polyvinylidine fluoride ($PVF_2$) and poly(tetrafluoroethylene), and fluoroalkyl methacrylates such as 2,2,2, trifluoroethyl methacrylate.

Other charge enhancing additives such as, for example, those illustrated in U.S. Pat. No. 5,928,830, incorporated by reference herein, including quaternary ammonium salts, and more specifically, distearyl dimethyl ammonium methyl sulfate (DDAMS), bis-1-(3,5-disubstituted-2-hydroxy phenyl)axo-3-(mono-substituted)-2-naphthalenolato(2-) chromate(1-), ammonium sodium and hydrogen (TRH), cetyl pyridinium chloride(CPC), FANAL PINK® D4830, and the like and others as specifically illustrated therein may also be utilized in the present invention.

The charge additives are added in various effective amounts, such as from about 0.5% to about 20% by weight, based on the sum of the weights of all polymer, conductive additive, and charge additive components.

The micro-powder, with optional charge enhancing additives included, may have an average diameter of, for example, about 0.01 micrometers to <1.0 micrometer. Preferably, the conductive micro-powder has an average diameter of, for example, about 0.04 to about 0.800 micrometers. In a most preferred embodiment, the micro-powder has an average diameter of, for example, about 0.1 micrometers to about 0.750 micrometers.

After the synthesis of the sub-micron powder, including the incorporation of conductive filler and optional charge enhancing additives, the resin may be incorporated onto the surface of the carrier. Various effective suitable processes can be selected to apply a coating to the surface of the carrier particles. Examples of typical processes for this purpose include roll mixing, tumbling, milling, shaking, electrostatic powder cloud spraying, fluidized bed, electrostatic disc processing, and an electrostatic curtain. See, for example, U.S. Pat. No. 6,042,981, incorporated herein by reference.

Following incorporation of the micro-powder onto the surface of the carrier, heating may be initiated to permit flow of the coating material over the surface of the carrier core. In a preferred embodiment, the micro-powder is fused to the carrier core in either a rotary kiln or by passing through a heated extruder apparatus.

In a preferred embodiment, the conductive polymer particles of the present invention are used to coat carrier cores of any known type by any known method, which carriers are then incorporated with any known toner to form a developer for xerographic printing. Suitable carriers may be found in, for example, U.S. Pat. Nos. 4,937,166 and 4,935,326, incorporated herein by reference, and may include granular zircon, granular silicon, glass, steel, nickel, ferrites, magnetites, iron ferrites, silicon dioxide, and the like.

Preferably, the core is a ferrite or a magnetite.

Carrier cores having a diameter in a range of, for example, about 5 micrometers to about 100 micrometers may be used. Preferably, the carriers are, for example, about 20 micrometers to about 60 micrometers. Most preferably, the carriers are, for example, about 30 micrometers to about 50 micrometers. In an especially preferred embodiment, a 35 micrometer ferrite core available from Powtek of Japan is used. The preferred ferrite core is a proprietary material believed to be a manganese/magnesium ferrite formulation.

Typically, the micro-powder covers, for example, about 60% to about 100% of the surface area of the carrier core using about 0.1% to about 3.0% coating weight. Preferably, about 75% to about 98% of the surface area is covered with the micro-powder using about 0.3% to about 2.0% coating weight. Most preferably, surface area coverage is about 85% to about 95% using about 1% coating weight.

The use of the sub-micron coating resins of this most preferred embodiment provide significant advantages over the prior art coating resins. Advantages include durable, well fixed coatings, a predictable tribolelectric charging rate, excellent stability, and excellent control over the A zone/C zone sensitivity.

Use of smaller-sized coating powders has proven more advantageous as a smaller amount by weight of the coating is needed to sufficiently coat a carrier core. Using less coating is cost effective and results in less coating separating from the carrier to interfere with the tribolelectric charging characteristics of the toner and/or developer.

A carrier coating commonly used is the Soken-116 PMMA available from Soken Chemical in Japan. This powder typically has a median diameter of 0.4 micrometers to 0.5 micrometers and is a made from polymethyl methacrylate. The use of Soken-116 to coat 30 micrometer to 50 micrometer ferrite cores requires about 2.5% to about 3.5% coating weight to achieve surface area coverage of 85% to 95%.

The conductive micro-powder resin of the present invention finds particular utility in a variety of xerographic copiers and printers, such as high speed xerographic color copiers, printers, digital copiers and more specifically, wherein color copies with excellent and substantially no background deposits are desirable in copiers, printers, digital copiers, and the combination of xerographic copiers and digital systems.

EXAMPLE I

A latex emulsion of methyl methacrylate (MMA) with methyl acrylate (MA) copolymer is separately generated from a monomer mixture containing 92% methyl methacrylate and 8% methyl acrylate. Approximately 95 grams of this monomer mixture is added to a solution of 1.9 g of SLS surfactant in 1.0 liters of distilled water, which had been degassed by stirring at 200 rpm for 1 hour at a circulating bath temperature of 68° C. Polymerization of the resulting emulsion was initiated by addition of 1.1 grams of ammonium persulfate dissolved in 3.3 grams of distilled water. After initiation was completed the remaining monomer mixture was added by means of a metering pump, at a rate of 1.2 g/minute. The final latex emulsion is determined to contain 22% of copolymer solids. The particle size of the latex was found to be 0.08 micrometers by Scanning Electron Microscopy. Isolation of the sub-micron powder, referred to herein as "micro-powder," was carried out by freeze drying such that the residual water content was approximately 1% by weight.

This micro-powder is then mixed with a conductive filler to form the micro-powder coating mixture. In this example carbon black sold under the trademark, VULCAN XC72, available from the Cabot Corporation is utilized. VULCAN XC72 has a diameter of 0.03 micrometers. This carbon black is mixed with the powder by use of a paint shaker or similar high intensity mixer, using approximately an amount of ⅛" diameter steel shot, for a total mixing time of five to fifteen minutes. Following mixing, the powder and a 35 micrometer ferrite carrier core is premixed at 200 to 400 rpm, for between 10 to 50 minutes before being passed through a rotary kiln at 190° C. to fuse the micro-powder to the carrier core.

Using scanning electron microscopy analysis (SEM), it was determined that the micro-powder provided coating coverage of 82% using 0.75% coating weight. The micro-powder was also determined to contain 6% of the conductive filler by weight.

The triboelectric properties of the coated carrier are determined by measuring a maximum charging position in the A-Zone and a maximum charging position in the C-Zone. These two values are used in the Relative Humidity (RH) Ratio which equals (A-Zone maximum/C-Zone maximum). The RH ratio of Example I is 1.19 when measured with a developer prepared with a model xerographic toner formulation.

EXAMPLE II

The micro-powder of this example is made identical to the micro-powder of Example I and is coated upon the same type of carrier, except the temperature of the coating process of the micro-powder is at 220° C. Coating area of 85% and a RH ratio of 1.03 are measured.

EXAMPLE III

The micro-powder of this example is made identical to the micro-powder of Example I and is coated upon the same type of carrier, except the coating weight is 1.25%, the micro-powder contains 12% by weight carbon black and the coating process of the micro-powder is performed at 220° C. Coating area of 87% and a RH ratio of 1.05 are measured.

EXAMPLE IV

The micro-powder of this example is made identical to the micro-powder of Example I and is coated upon the same type of carrier, except the coating weight was 1.25% and the micro-powder contains 12% by weight carbon black. Coating area of 85% and a RH ratio of 1.25 are measured.

Comparative Example I

In this comparative example, the powder Soken 116 PMMA is used in conjunction with the 35 micrometer ferrite of Examples I–IV. This powder is available from Soken Chemical in Japan, typically has a diameter of 0.4 micrometers to 0.5 micrometers, and is a made from polymethyl methacrylate.

The Soken 116 PMMA is used in the same manner as Examples I–IV, except no carbon black is incorporated. The coating process is performed at 205° C. In order to obtain surface area coverage of 85%, about 3.0% coating weight is required. An RH ratio of 0.61 is measured from a developer prepared with a standard xerographic toner formulation.

Comparative Example II

In this comparative example, the micro-powder of this example is made identical to the micro-powder of Example I and is coated upon the same type of carrier, except that no conductive filler is utilized. The coating weight is 0.5%, and the coating process of the micro-powder is performed at 205° C. Coating area of 90% and a RH ratio of 0.76 are measured, using the same xerographic toner formulation as in Comparative Example I.

The Data in the Table 1 shows coating coverage, tribo stability and RH ratio advantage for 0.5% to 1.25% coat weight with SLS-PMMA micro-powder resin in comparison to Soken-116 PMMA at 3% coat weight. Coating efficiency or coverage is nearly the same at only 0.5% coat weight of the SLS-PMMA, micro-powder, as compared to 3% of Soken-116 powder. Also, as RH Ratio (A-Zone/C-Zone) increases, the xerographic performance will be more robust.

TABLE 1

|  | Polymer | Coating WT % | Carbon Black WT % | Coating Process Temp. ° C. | Coating Area % By SEM | Tribo Max. A-Zone | Tribo Max. C-Zone | RH Ratio |
| --- | --- | --- | --- | --- | --- | --- | --- | --- |
| Example I | SLS-PMMA | 0.75 | 6 | 190 | 82 | 9.25 | 7.75 | 1.19 |
| Example II | SLS-PMMA | 0.75 | 6 | 220 | 85 | 8.00 | 7.75 | 1.03 |
| Example III | SLS-PMMA | 1.25 | 12 | 220 | 87 | 5.75 | 5.50 | 1.05 |
| Example IV | SLS-PMMA | 1.25 | 12 | 190 | 85 | 7.50 | 6.00 | 1.25 |
| Comparative Example I | Soken-MP116 | 3.0 | 0 | 205 | 85 | 9.75 | 16.00 | 0.61 |
| Comparative Example II | SLS-PMMA | 0.5 | 0 | 205 | 90 | 11.25 | 14.75 | 0.76 |

What is claimed is:

1. A micro-powder, comprising:
   (i) a sub-micron sized powder recovered from a latex emulsion of polymer and surfactant, wherein the sub-micron sized powder retains an amount of the surfactant;
   (ii) a conductive filler incorporated into the micro-powder; and
   (iii) optional charge enhancing additives incorporated into the micro-powder.

2. The micro-powder of claim 1, wherein the polymer is polymethyl methacrylate polymer or copolymer.

3. A micro-powder, comprising:
   (i) a sub-micron sized powder recovered from a latex emulsion of polymer and surfactant;
   (ii) a conductive filler incorporated into the micro-powder; and (iii) optional charge enhancing additives incorporated into the micro-powder; and (iv) wherein the polymer is polymethyl methacrylate copolymer with fluoro-ethyl methacrylate or fluoro-ethylacrylate.

4. The micro-powder of claim 3, wherein the fluoro-ethyl methacrylate is 2,2,2 trifluoro-ethyl methacrylate.

5. The micro-powder of claim 1, wherein the charge enhancing additives are present in the powder.

6. The micro-powder of claim 5, wherein the charge enhancing additives are fluoro polymer powders or fluorinated polymers.

7. The micro-powder of claim 6, wherein the fluorinated polymers are polyvinylidine fluoride ($PVF_2$), poly (tetrafluoroethylene), or fluoroalkyl methacrylates.

8. The micro-powder of claim 7, wherein the fluoroalkyl methacrylate is 2,2,2, trifluoro-ethyl methacrylate.

9. The micro-powder of claim 2, wherein the conductive filler is carbon black.

10. The micro-powder of claim 3, wherein the sub-micron sized powder retains an amount of the surfactant.

11. The micro-powder of claim 1, wherein the conductive filler is carbon black.

12. The micro-powder of claim 1, wherein the conductive filler comprises about 5% to about 20% by weight of the micro-powder.

13. The micro-powder of claim 1, wherein the micro-powder has an average diameter of from about 0.01 micrometers to less than about 1.0 micrometer.

14. The micro-powder of claim 1, wherein the micro-powder has an average diameter of about 0.08 micrometers to about 0.25 micrometers.

15. The micro-powder of claim 1, wherein the surfactant is anionic.

16. The micro-powder of claim 1, wherein only one surfactant is present.

17. A carrier for use in xerographic developer, comprising:

carrier core particles coated with a micro-powder, wherein the micro-powder comprises a sub-micron sized powder recovered from a latex emulsion of polymer and surfactant, wherein the sub-micron sized powder retains an amount of the surfactant, a conductive filler incorporated into the micro-powder, and optional charge enhancing additives incorporated into the micro-powder.

18. The carrier of claim 17, wherein the carrier core particles are about 30 micrometers to about 50 micrometers in diameter.

19. The carrier of claim 17, wherein the carrier core particles are ferrites or magnetites.

20. The carrier of claim 17, wherein the carrier core particles are ferrites and have a diameter of about 35 micrometers.

21. The carrier of claim 17, wherein about 85% to about 95% of the surface of the carrier core particles are coated with the micro-powder at a coating weight of about 1%.

22. The carrier of claim 17, wherein the micro-powder is about 0.08 micrometers to about 0.25 micrometers in diameter.

23. A developer comprising toner and carrier particles, wherein the carrier particles comprise carrier core particles coated with a micro-powder, wherein the micro-powder comprises a sub-micron sized powder recovered from a latex emulsion of polymer and surfactant, wherein the sub-micron sized powder retaining powder retains an amount of the surfactant, a conductive filler incorporated into the micro-powder, and optional charge enhancing additives incorporated into the micro-powder.

24. The micro-powder of claim 23, wherein the polymer is polymethyl methacrylate polymer or copolymer.

25. The micro-powder of claim 23, wherein the conductive filler is carbon black.

26. The micro-powder of claim 3, wherein the micro-powder has an average diameter of about 0.08 $\mu$m to about 0.25 $\mu$m.

27. The micro-powder of claim 23, wherein the polymer is polymethyl methacrylate copolymer with fluoro-ethyl methacrylate or fluoro-ethylacrylate.

* * * * *